(12) United States Patent
Kim et al.

(10) Patent No.: US 12,170,754 B2
(45) Date of Patent: Dec. 17, 2024

(54) APPARATUS AND METHOD FOR PROVIDING WRAP-AROUND VIEW BASED ON 3D DISTANCE INFORMATION

(71) Applicant: KOREA ELECTRONICS TECHNOLOGY INSTITUTE, Seongnam-si (KR)

(72) Inventors: Seunghun Kim, Seoul (KR); Junghoon Hwang, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 761 days.

(21) Appl. No.: 17/135,167

(22) Filed: Dec. 28, 2020

(65) Prior Publication Data

US 2022/0191463 A1 Jun. 16, 2022

(30) Foreign Application Priority Data

Dec. 16, 2020 (KR) .................. 10-2020-0176113

(51) Int. Cl.
*H04N 13/351* (2018.01)
*B25J 9/16* (2006.01)
*G06T 17/00* (2006.01)
*H04N 13/139* (2018.01)

(52) U.S. Cl.
CPC .......... *H04N 13/351* (2018.05); *B25J 9/1697* (2013.01); *G06T 17/00* (2013.01); *H04N 13/139* (2018.05)

(58) Field of Classification Search
CPC .... G06T 17/00; H04N 13/351; H04N 13/139; B25J 9/1697
See application file for complete search history.

(56) References Cited

U.S. PATENT DOCUMENTS 11,734,468 B2 * 8/2023 Lewis ................. G06T 7/55
    703/1
2020/0111251 A1 * 4/2020 Shi .................... G06V 10/764

FOREIGN PATENT DOCUMENTS

KR   10-2017-0022508 A   3/2017
KR      10-1888171 B     8/2018
KR   10-2019-0090515 A   8/2019
(Continued)

OTHER PUBLICATIONS

WIPO english translation of WO 2019146903. (Year: 2019).*
(Continued)

*Primary Examiner* — Jason Holloway
*Assistant Examiner* — Christopher A Buksa
(74) *Attorney, Agent, or Firm* — Knobbe Martens Olson & Bear, LLP

(57) ABSTRACT

This application relates to an apparatus and method for providing a wrap-around view based on three-dimensional (3D) distance information. The apparatus may include a camera module, a sensor module, and a controller. The camera module acquires image information in all directions, and the sensor module measures 3D spatial information in all directions. The controller is configured to generate 3D distance information by projecting the measured 3D spatial information onto a two-dimensional (2D) plane, to generate a 3D model in a 3D space by using the generated 3D distance information, and to generate a wrap-around view by mapping the acquired image information to the generated 3D model.

7 Claims, 12 Drawing Sheets

(56) References Cited

FOREIGN PATENT DOCUMENTS

KR  10-2020-0008427 A      1/2020
WO  WO-2019146903 A1 *  8/2019  ............. G06T 17/00

OTHER PUBLICATIONS

Korean Office Action in Application No. 10-2020-0176113 dated Oct. 15, 2021 in 5 pages.

Chen, et al. "Assessing the Accuracy and Precision of Imperfect Point Clouds for 3D Indoor Mapping and Modeling", ISPRS Annals of the Photogrammetry, Remote Sensing and Spatial Information Sciences, vol. IV-4/W6, pp. 3-10, 13th 3D GeoInfo Conference, Delft, The Netherlands (Oct. 1-2, 2018).

Yoon, et al. "Human Recognition and Tracking in Narrow Indoor Environment using 3D Lidar Sensor," 2020 20th International Conference on Control, Automation and Systems (ICCAS 2020), BEXCO, Busan, Korea (Oct. 13-16, 2020).

* cited by examiner

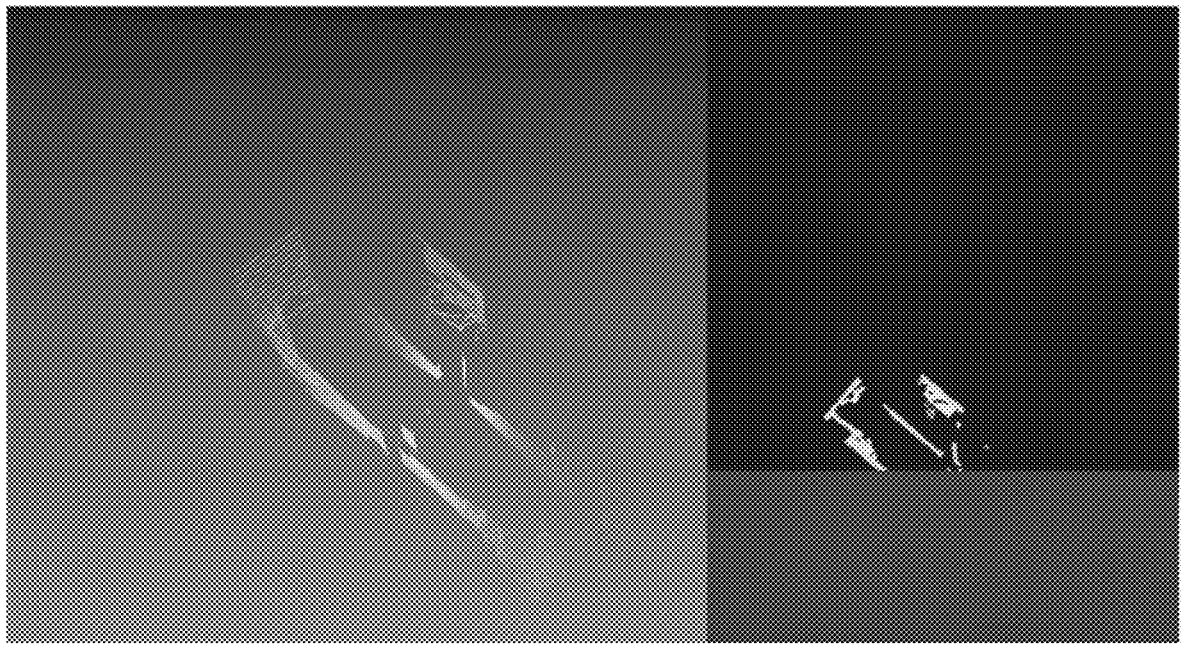
FIG. 7A                                                    FIG. 7B

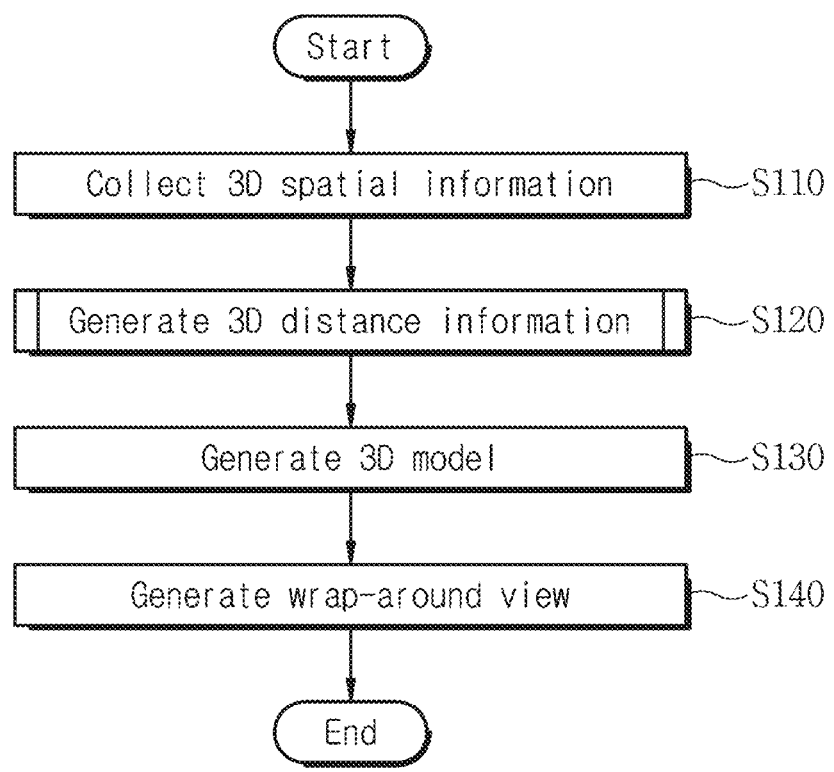

APPARATUS AND METHOD FOR PROVIDING WRAP-AROUND VIEW BASED ON 3D DISTANCE INFORMATION

CROSS-REFERENCE TO RELATED APPLICATION

The present application claims priority to Korean Patent Application No. 10-2020-0176113 filed on Dec. 16, 2020 in the Korean Intellectual Property Office, which is incorporated herein in its entirety by reference.

BACKGROUND

Technical Field

The present disclosure generally relates to wrap-around view monitoring. More particularly, the present disclosure relates to an apparatus and method for providing a wrap-around view based on three-dimensional (3D) distance information.

Description of Related Technology

A robot is a machine capable of carrying out a complex series of actions automatically. In the modem society, the robot industry has developed rapidly, and is nowadays expanding from industrial or special-purpose robots to domestic robots, educational robots, and various kinds of service robots. Because these robots often perform tasks in a human living environment, most of them are small-sized mobile robots.

Research on the movement of mobile robots is one of important research topics in the robotics field. Until now, research on mobile robots has mainly been conducted on robots in the form of a fixed type in a specific area or a type of robot that moves in a predetermined path. However, in recent years, research on a technology for moving a robot through a user's control is increasing.

SUMMARY

The present disclosure provides an apparatus and method for providing a wrap-around view based on three-dimensional (3D) distance information.

According to embodiments of the present disclosure, an apparatus for providing a wrap-around view based on three-dimensional (3D) distance information may include a camera module configured to acquire image information in all directions; a sensor module configured to measure 3D spatial information in all directions; and a controller configured to generate 3D distance information by projecting the measured 3D spatial information onto a two-dimensional (2D) plane, to generate a 3D model in a 3D space by using the generated 3D distance information, and to generate a wrap-around view by mapping the acquired image information to the generated 3D model.

In the apparatus, the sensor module may includes a 3D Lidar sensor for measuring first spatial information including 3D spatial coordinates and intensity of reflected signals, and a navigation sensor for measuring second spatial information including roll and pitch.

In the apparatus, the controller may be further configured to perform a posture correction on the first spatial information by using at least one of the roll and the pitch of the second spatial information.

In the apparatus, the controller may be further configured to remove spatial information corresponding to a floor surface and a ceiling surface from the 3D spatial information by using Z-axis information of the 3D spatial information.

In the apparatus, the controller may be further configured to remove outliers from the 3D spatial information.

In the apparatus, the controller may be further configured to extract a wall surface from the 3D spatial information, and to generate the 3D distance information by removing Z-axis information from the 3D spatial information, based on the extracted wall surface.

In the apparatus, the controller may be further configured to generate a 2D model in which a 2D space is modeled using the 3D distance information, and to generate a 3D model by creating a wall surface perpendicular to edge points whose distance are shorter than a predetermined radius among points existing in the generated 2D model.

In the apparatus, the controller may be further configured to match points included in the 3D model with points included in projection information of the image information, and to perform image mapping by projecting the image information on the point-matched 3D model.

According to embodiments of the present disclosure, a system for monitoring a moving object may include the moving object autonomously moving and performing a particular work; a wrap-around view providing apparatus installed in the moving object and generating a wrap-around view of the moving object; and a user terminal receiving the wrap-around view from the wrap-around view providing apparatus and outputting the received wrap-around view to monitor the moving object. In the system, the wrap-around view providing apparatus may include a camera module configured to acquire image information in all directions; a sensor module configured to measure 3D spatial information in all directions; and a controller configured to generate 3D distance information by projecting the measured 3D spatial information onto a two-dimensional (2D) plane, to generate a 3D model in a 3D space by using the generated 3D distance information, and to generate the wrap-around view by mapping the acquired image information to the generated 3D model.

According to embodiments of the present disclosure, a method for providing a wrap-around view based on three-dimensional (3D) distance information may include, at a wrap-around view providing apparatus, collecting information by acquiring image information in all directions and measuring 3D spatial information in all directions; at the wrap-around view providing apparatus, generating 3D distance information by projecting the measured 3D spatial information onto a 2D plane; at the wrap-around view providing apparatus, generating a 3D model in which a 3D space is modeled using the generated 3D distance information; and at the wrap-around view providing apparatus, generating a wrap-around view by image-mapping the image information to the generated 3D model.

The apparatus and method according to embodiments of the present disclosure may include measuring 3D spatial information through the 3D Lidar and the navigation sensor, generating 3D distance information by projecting the measured 3D spatial information onto a 2D plane, and generating a wrap-around view by using the generated 3D distance information.

Accordingly, the disclosure can not only provide a 3D effect like a perspective view of a real world by reflecting the 3D spatial information, but also minimize undesired image distortion.

BRIEF DESCRIPTION OF THE DRAWINGS

FIGS. 4A, 4B, 5A, 5B, 6A, 6B, 7A and 7B are diagrams illustrating examples of 3D spatial information according to an embodiment of the present disclosure.

FIG. 12 is a flow diagram illustrating a method for providing a wrap-around view according to an embodiment of the present disclosure.

DETAILED DESCRIPTION

Figure 1:
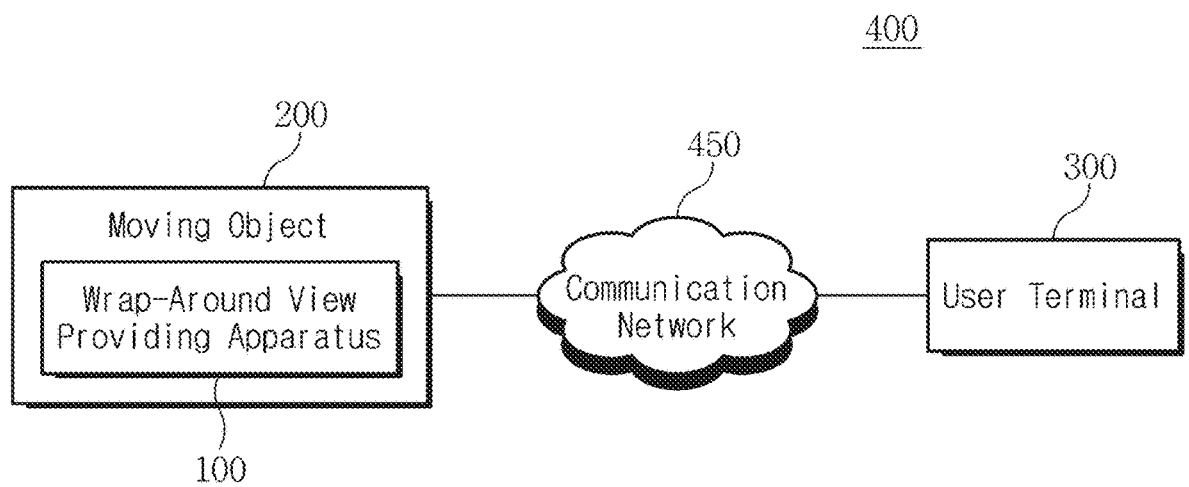
FIG. 1 is a block diagram illustrating a moving object monitoring system according to an embodiment of the present disclosure.

Generally, the remote control of a robot was possible only through a limited viewing angle. Many studies have been attempted to overcome this limitation, and an omnidirectional camera, a wide-angle camera, and the like have been studied. However, these solutions often provide distorted images, so there is a problem that skilled manipulation is possible only through training or experience. In particular, in case of remotely controlling a robot, a large number of sensors are required to properly recognize an obstacle through a provided image, and if a display resolution is low, it is difficult for a user to accurately recognize obstacles.

Hereinafter, embodiments of the present disclosure will be described in detail with reference to the accompanying drawings. The present disclosure may, however, be embodied in many different forms and should not be construed as being limited to the embodiments set forth herein. Rather, these embodiments are provided so that the disclosure will be thorough and complete and will fully convey the scope of the disclosure to those skilled in the art.

In the following description of embodiments, techniques that are well known in the art and not directly related to the present disclosure are not described. This is to clearly convey the subject matter of the present disclosure by omitting an unnecessary explanation. For the same reason, some elements in the drawings are exaggerated, omitted, or schematically illustrated. Also, the size of each element does not entirely reflect the actual size. In the disclosure, the same or corresponding elements are denoted by the same reference numerals.

FIG. 1 is a block diagram illustrating a moving object monitoring system according to an embodiment of the present disclosure.

Referring to FIG. 1, the moving object monitoring system 400 supports a user to receive a wrap-around view of a moving object 200 from a remote location. In the disclosure, the wrap-around view refers to an around view generated using three-dimensional (3D) distance information based on 3D spatial information, and gives a 3D effect with minimized image distortion as if the user actually sees the moving object 200 and its surroundings. The moving object monitoring system 400 includes a wrap-around view providing apparatus 100, the moving object 200, and a user terminal 300.

The wrap-around view providing apparatus 100 is installed in the moving object 200 and generates a wrap-around view of the moving object 200 in real time. Specifically, the wrap-around view providing apparatus 100 captures images in all directions, measures 3D spatial information in all directions, generates 3D distance information by projecting the measured 3D spatial information onto a 2D plane, generates a 3D model in a 3D space by using the generated 3D distance information, and generates a wrap-around view by mapping the captured images to the generated 3D model. The wrap-around view providing apparatus 100 will be described below in more detail.

The moving object 200 may autonomously move and perform a particular work in accordance with a predetermined algorithm. In addition, the moving object 200 may be remotely controlled based on an external control signal. The moving object 200 may be, for example, a mobile robot. Alternatively, the moving object 200 may be an industrial or special-purpose robot, a vehicle, a drone, or any other type movable entity.

The user terminal 300 is a user's electronic device capable of receiving the generated wrap-around view from the wrap-around view providing apparatus 100 and outputting the received wrap-around view to monitor the moving object 200. To this end, the user terminal 300 includes a display capable of outputting an image. In addition, the user terminal 300 may generate a control signal for controlling the moving object 200 and transmit the generated control signal to the mobile 200 to remotely control the moving object 200. That is, while checking the wrap-around view displayed on the user terminal 300, the user can appropriately manipulate the moving object 200 based on control signals transmitted to the moving object 200 through the user terminal 300. In the disclosure, the user terminal 300 may be a smart phone, a tablet PC, a handheld computer, a laptop, a desktop, a wearable device, or any other personal computing system.

The moving object monitoring system 400 may include a communication network 450 provided between the user terminal 300 and at least one of the wrap-around view providing apparatus 100 and the moving object 200. The communication network 450 may be composed of a backbone network and a subscriber network. The backbone network may be composed of one of, or a combination of, X.25 network, frame relay network, ATM network, multi-protocol label switching (MPLS) network, and generalized multi-protocol label switching (GMPLS) network. The subscriber networks may be FTTH (Fiber To The Home), ADSL (Asymmetric Digital Subscriber Line), cable network, Zigbee, Bluetooth, Wireless LAN (IEEE 802.11b, IEEE 802.11a, IEEE 802.11g, IEEE 802.11n), Wireless Hart (ISO/IEC62591-1), ISA100.11a (ISO/IEC 62734), COAP (Constrained Application Protocol), MQTT (Multi-Client Publish/Subscribe Messaging), WiBro (Wireless Broadband), Wimax, 3G, HSDPA (High Speed Downlink Packet Access), 4G, or 5G. In some embodiments, the communication network 450 may be Internet or a mobile communication network. In addition, the communication network 450 may be any other wireless or wired network widely known or to be developed.

Figure 2:
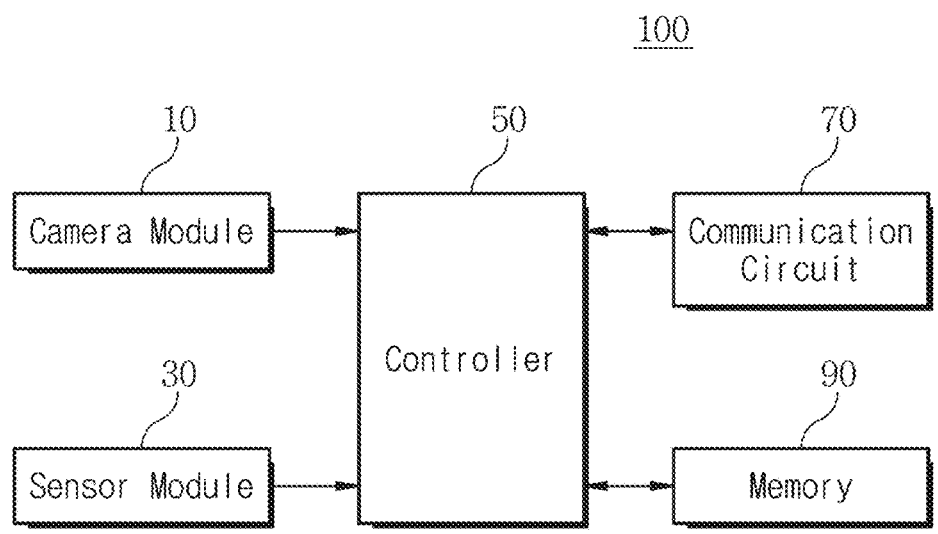
FIG. 2 is a block diagram illustrating a wrap-around view providing apparatus according to an embodiment of the present disclosure.

FIG. 2 is a block diagram illustrating a wrap-around view providing apparatus according to an embodiment of the present disclosure.

Referring to FIGS. 1 and 2, the wrap-around view providing apparatus 100 includes a camera module 10, a sensor module 30, and a controller 50, and may further include a communication circuit 70 and a memory 90.

The camera module 10 acquires image information in all directions. The camera module 10 may be composed of a plurality of cameras for capturing images in different directions around the moving object 200. Each camera may include a lens and an optical sensor. The optical sensor collects image information through the lens and converts the image information into electrical image signals. The optical sensor may be, for example, a charge coupled device (CCD) sensor.

The sensor module 30 measures 3D spatial information in all directions. The sensor module 30 may include a 3D Lidar sensor and a navigation sensor. The 3D Lidar sensor measures first spatial information including 3D spatial coordinates (x, y, z) and the intensity of reflected signals. The 3D Lidar sensor may have a 16-channel laser, acquire at least 600,000 points per second using a TCP/IP cable, and scan up to 100 m. The navigation sensor measures second spatial information including roll and pitch. The navigation sensor may be an AHRS (Attitude and Heading Reference System) sensor composed of a 3-axis geomagnetic sensor, a 3-axis gyro sensor, and a 3-axis acceleration sensor so as to minimize the distortion of orientation values due to external magnetic disturbance.

The controller 50 generates 3D distance information by projecting the 3D spatial information, measured by the sensor module 30, onto a two-dimensional (2D) plane. In addition, the controller 50 generates a 3D model in a 3D space by using the generated 3D distance information. Also, the controller 50 generates a wrap-around view by mapping the image information, acquired by the camera module 10, to the generated 3D model. That is, the controller 50 does not typically generate a wrap-around view through conventional simple image matching, but generates a wrap-around view with minimized image distortion by performing image matching using 3D distance information reflecting 3D spatial information.

The communication circuit 70 performs communication with the user terminal 300. Specifically, the communication circuit 70 transmits a wrap-around view to the user terminal 300. In addition, the communication circuit 70 may receive a control signal for controlling the generation of a wrap-around view from the user terminal 300. For example, the communication circuit 70 may receive a control signal containing a command to generate or not to generate a wrap-around view from the user terminal 300. If the communication circuit 70 receives a control signal for generating a wrap-around view from the user terminal 300, the controller 50 may control the generation of the wrap-around view in response to the control signal. Basically, the controller 50 may generate a wrap-around view when the moving object 200 is operated.

The memory 90 stores a plurality of images acquired by the camera module 10. In addition, the memory 90 stores 3D spatial information measured by the sensor module 30. Also, the memory 90 stores 3D distance information, a 3D model, and a wrap-around view generated by the controller 50. The memory 90 may include at least one of a flash memory, a hard disk, a media card micro type memory, a card type memory (e.g., SD or XD memory), a random access memory (RAM), a static RAM (SRAM), a read-only memory (ROM), a programmable ROM (PROM), an electrically erasable PROM (EEPROM), a magnetic memory, a magnetic disk, and an optical disk.

Figure 3:
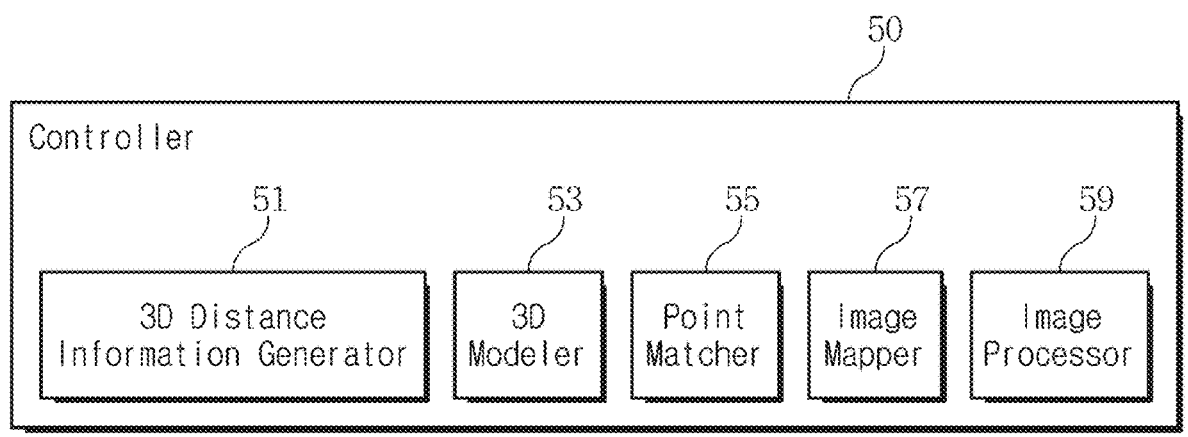
FIG. 3 is a block diagram illustrating the controller shown in FIG. 2.
Figures 4A, 4B:
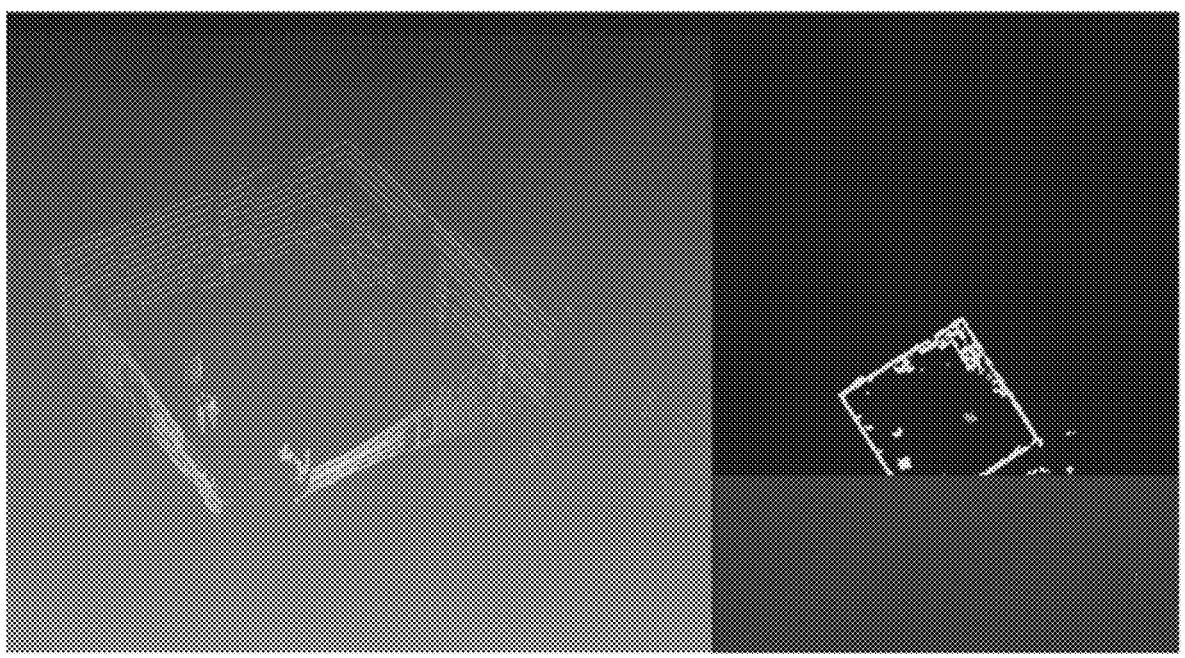
Figures 5A, 5B:
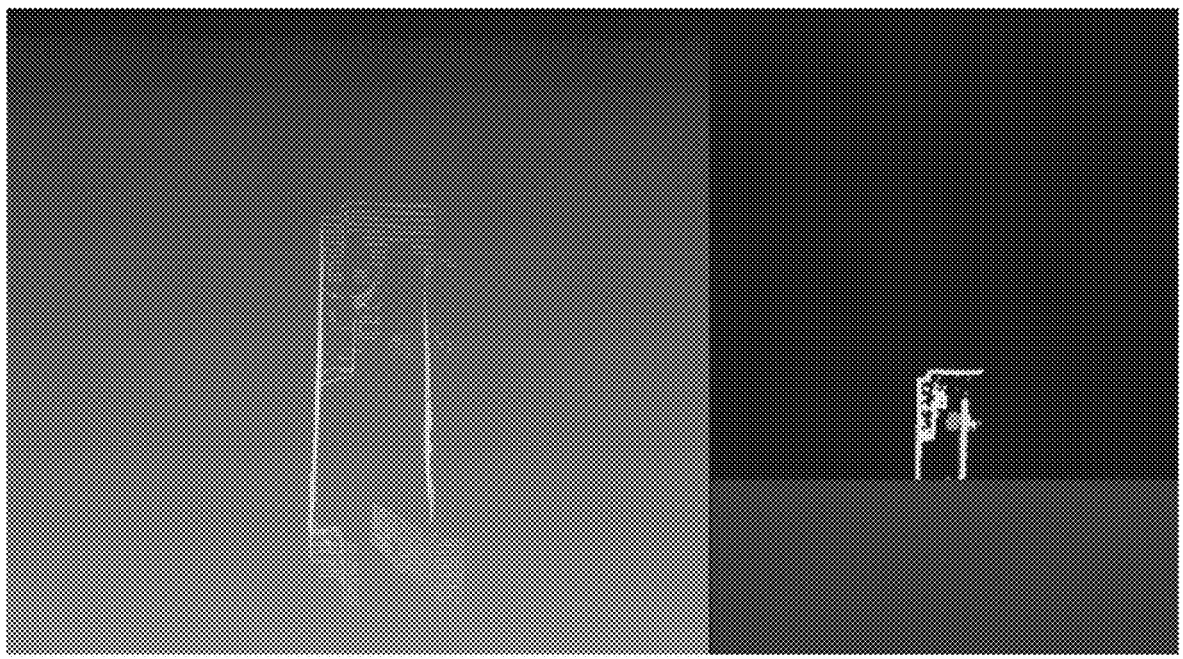
Figures 6A, 6B:
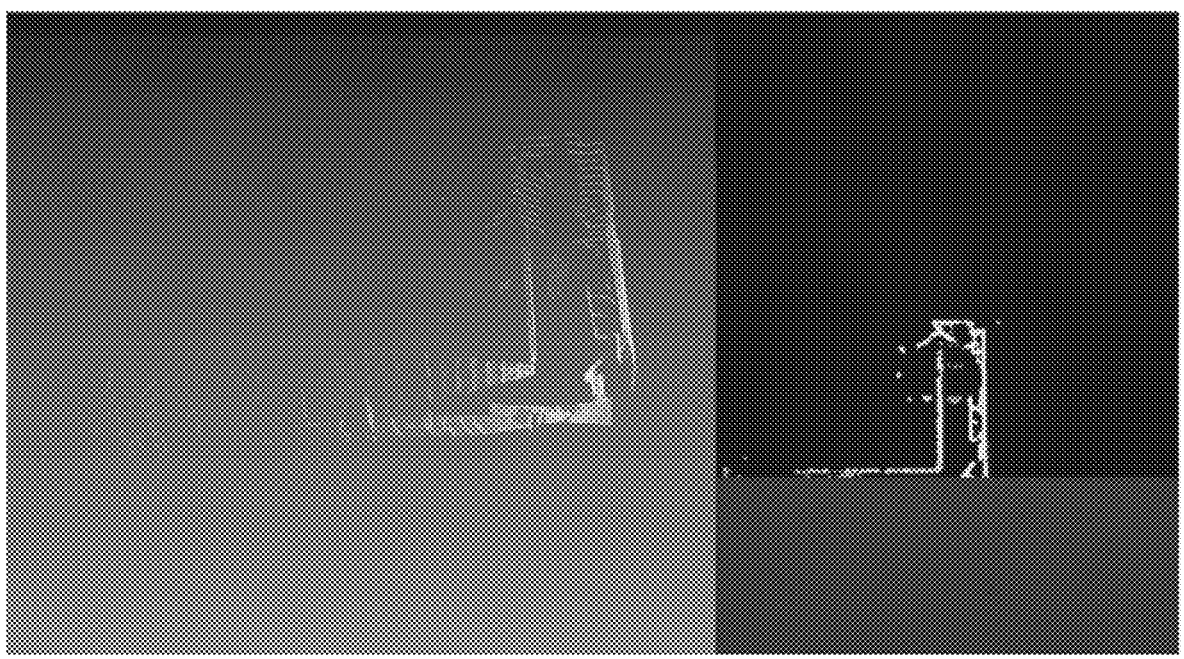
Figure 8:
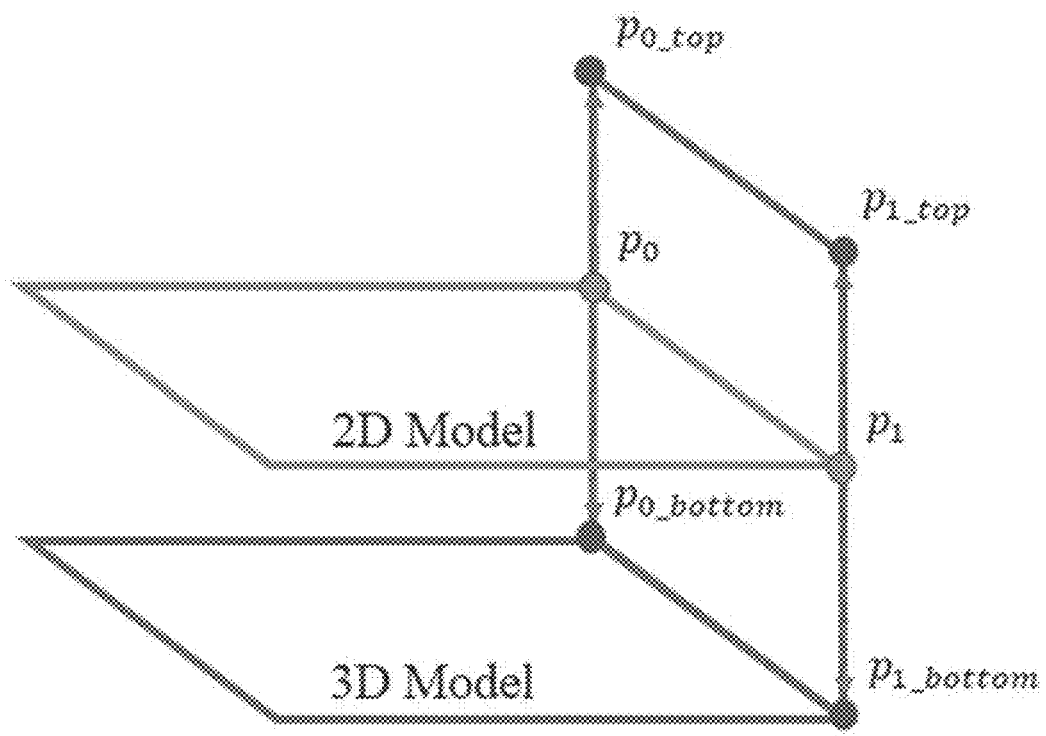
FIG. 8 is a diagram illustrating an example of 3D modeling according to an embodiment of the present disclosure.
Figure 9A:
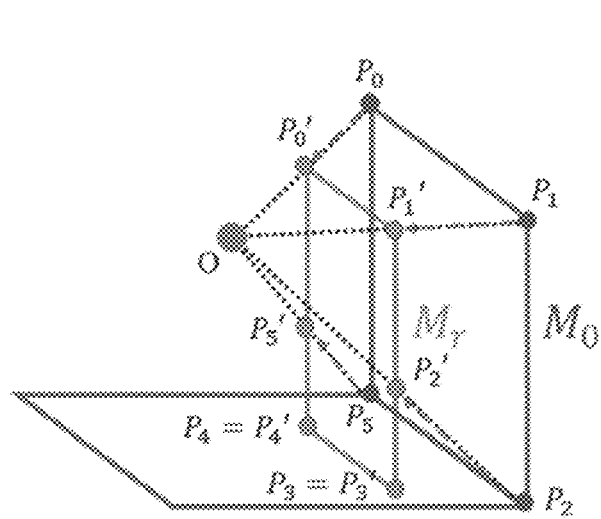
FIGS. 9A and 9B are diagrams illustrating an example of point matching according to an embodiment of the present disclosure.
Figure 9B:
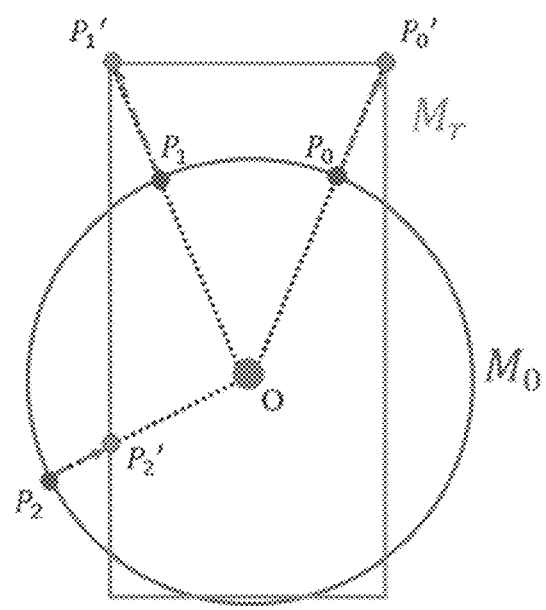
Figure 10A:
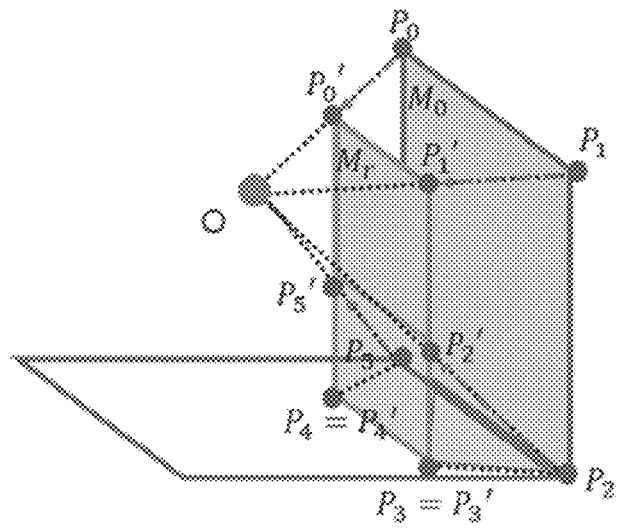
FIGS. 10A and 10B are diagrams illustrating an example of image mapping according to an embodiment of the present disclosure.
Figure 10B:
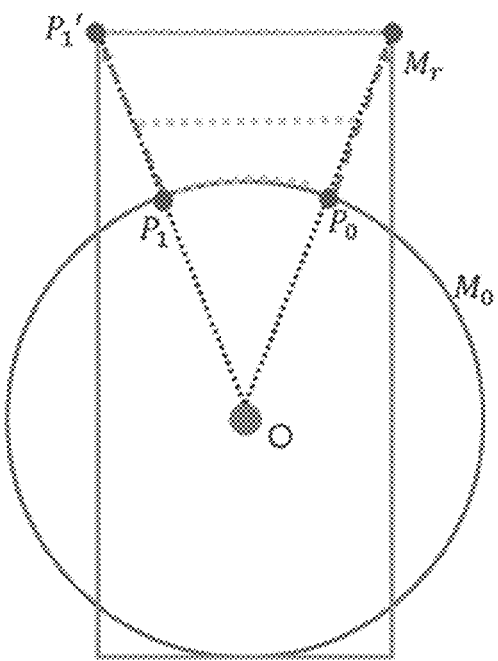

FIG. 3 is a block diagram illustrating the controller shown in FIG. 2. FIGS. 4A, 4B, 5A, 5B, 6A, 6B, 7A and 7B are diagrams illustrating examples of 3D spatial information according to an embodiment of the present disclosure. FIG. 8 is a diagram illustrating an example of 3D modeling according to an embodiment of the present disclosure. FIGS. 9A and 9B are diagrams illustrating an example of point matching according to an embodiment of the present disclosure. FIGS. 10A and 10B are diagrams illustrating an example of image mapping according to an embodiment of the present disclosure.

FIGS. 4A, 5A, 6A and 7A correspond to a perspective view showing 3D spatial information measured in each space, and FIGS. 4B, 5B, 6B and 7B correspond to a top view showing such 3D spatial information.

Referring to FIGS. 2 to 10B, the controller 50 includes a 3D distance information generator 51, a 3D modeler 53, a point matcher 55, an image mapper 57, and an image processor 59.

The 3D distance information generator 51 performs a posture correction on the first spatial information by using at least one of a roll and a pitch of the second spatial information measured by the sensor module 30. Because the first spatial information and the second spatial information do not contain attitude values of a sensor, a tilted state of the sensor causes variations of all values in spatial information. Therefore, the 3D distance information generator 51 performs in advance a posture correction of the sensor so as to improve the accuracy of values in a process to be performed later. For example, by using at least one of a roll and a pitch included in the second spatial information, the 3D distance information generator 51 aligns the Z-axis of the first spatial information measured in a state that is not parallel with a floor. That is, the 3D distance information generator 51 can correct the posture of the sensor by using the first and second spatial information measured in a space having various shape of walls, and thereby perform posture correction so that the Z-axis and walls are parallel with each other in the 3D spatial information.

In addition, the 3D distance information generator 51 removes spatial information corresponding to a floor surface and a ceiling surface from the 3D spatial information by using Z-axis information of the 3D spatial information. For example, the 3D distance information generator 51 may assign upper and lower effective ranges based on the Z-axis in a state where the entire 3D spatial information has been corrected through a Z-axis pass through algorithm, and then remove unnecessary spatial information corresponding to the floor and ceiling surfaces. In this case, the posture-corrected 3D spatial information includes a 3D coordinate system of Z-up. For example, when the origin of a 3D Lidar sensor is (0, 0, 0), the 3D distance information generator 51 may determine only information corresponding to 0.0 to 1.0 m above the Z-axis (Z-up) as valid values and remove the remaining 3D spatial information. Meanwhile, removing spatial information corresponding to floor and ceiling surfaces from 3D spatial information may be alternatively performed using any other technique well known in the art.

In addition, the 3D distance information generator 51 removes outliers from the 3D spatial information. If there are many outliers distributed throughout the 3D spatial information, it is difficult to perform normal estimation or estimate curvature change. Further, if point cloud registration is required, serious errors may occur. Therefore, by using a statistical outlier removal filter, the 3D distance information generator 51 removes outliers from 3D spatial information. The statistical outlier removal filter can filter outliers by calculating a standard deviation and a global distances mean for distances from neighboring points. That is, the statistical outlier removal filter calculates an average distance between each point and all neighboring points on the assumption that the resulted distribution is a Gaussian distribution having an average and standard deviation, and determines as an outlier a case where the average distance of all points exceeds the thresholds of the global distance average and the standard deviation. Meanwhile, the 3D distance information generator 51 may remove outliers by adjusting the threshold of the standard deviation. However, unlike an obstacle having a large surface such as a wall or a desk, an obstacle of a relatively small size may be removed even it is not an actual outlier. Thus, in this case, an optimized threshold may be calculated and set as a fixed threshold.

In addition, the 3D distance information generator 51 extracts a wall surface from the 3D spatial information. Specifically, by using a region growing segmentation algorithm, the 3D distance information generator 51 may extract a wall surface from the 3D spatial information. For example, because the wall surface is measured as a shape that respective 3D points in the 3D spatial information have a specific coupling property, the 3D distance information generator 51 may merge close points based on the smoothness constraint similarity of the respective 3D points, perform similarity comparison through point normal angle comparison, and extract a normal vector from each of the 3D points. As a result of segmentation, portions corresponding to respective walls are grouped. The 3D distance information generator 51 may remove points that are not included in any group from all points except points segmented through the region growing segmentation algorithm, and then extract the wall surface by using the remaining points.

In addition, the 3D distance information generator 51 generates 3D distance information by removing Z-axis information, based on the extracted wall surface. The 3D distance information generator 51 may set all point values corresponding to the Z-axis to zero and project the 3D spatial information as a 2D image by using only the x and y coordinates.

The 3D modeler 53 generates a 2D model in which a 2D space is modeled using the 3D distance information. The 2D model may be a floor surface that is a basis for generating a 3D model. In addition, the 3D modeler 53 generates a 3D model by creating a wall surface perpendicular to edge points whose distance are shorter than a predetermined radius among points existing in the generated 2D model. When positions of edge points are measured to be shorter than the sensing radius of the sensor, the 3D modeler 53 may determine that the wall surface is at the positions.

Specifically, the 3D modeler 53 generates the 2D model by connecting neighboring points in a clockwise or counterclockwise direction based on a point whose angle is closest to zero among points included in the 3D distance information. Therefore, the generated 2D model may be a plane parallel with the ground. In addition, as shown in FIG. 8, the 3D modeler 53 creates a wall surface by connecting four points ($P_{0\_top}$, $P_{0\_bottom}$, $P_{1\_top}$, $P_{1\_bottom}$) vertically residing above and below two adjacent edge points ($P_0$ and $P_1$) among edge points existing in the generated 2D model.

Similarly, the 3D modeler 53 repeatedly creates wall surfaces from edge points existing in the 2D model and thereby generates the 3D model.

The point matcher 55 matches points included in the 3D model generated by the 3D modeler 53 with points included in projection information of the image acquired by the camera module 10, thereby allowing the spatial information to be reflected in the 3D model as shown in FIGS. 9A and 9B. The projection information refers to values of positions onto which the image is projected. Such point matching may be a pre-calibration performed before the image is mapped to the 3D model. In order to quickly perform point matching, the point matcher 55 may preferentially match edge points among points included in the 3D model to reflect overall spatial information first, and then reflect the remaining spatial information.

Specifically, as shown in FIGS. 9A and 9B, the point matcher 55 reflects the projection information ($M_o$) onto the 3D model ($M_r$). That is, the point matcher 55 matches, to the 3D model, the projection information having a shape different from that of the 3D model based on the reference point (O), thereby preventing in advance any projection error that may occur when an image is projected. For example, the point matcher 55 may match the $P_0$ point in the projection information to the corresponding $P_0'$ point among points in the 3D model, the $P_1$ point to the $P_1'$ point, and the $P_2$ point to the $P_2'$ point.

The image mapper 57 performs image mapping by projecting an image corresponding to points existing in the 3D model point-matched by the point matcher 55. The image mapper 57 may perform such image mapping by using point pairs obtained in the point matching process. That is, the image mapper 57 may determine which region of the 3D model is a floor region or a wall region through point matching, and then project the corresponding image. For example, as shown in FIGS. 10A and 10B, the image mapper 57 may project an image corresponding to the point $P_0$ onto the point $P_0'$ among points of the 3D model, and project an image corresponding to the point $P_1$ onto the point $P_1'$.

The image processor 59 removes distortion from the image information acquired by the camera module 10, and performs image processing to cut or convert an unnecessary portion of the image. The image information may be a plurality of images collected by a plurality of cameras. The image processor 59 may merge a plurality of processed images into a single image.

Figure 11A:
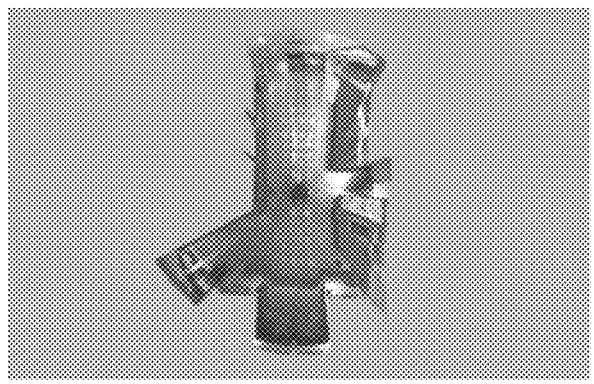
FIGS. 11A and 11B are diagrams illustrating an example of a wrap-around view according to an embodiment of the present disclosure.
Figure 11B:

FIGS. 11A and 11B are diagrams illustrating an example of a wrap-around view according to an embodiment of the present disclosure. FIG. 11A is a top view showing the wrap-around view, FIG. 11B is a perspective view showing the wrap-around view.

Referring to FIGS. 11A and 11B, the wrap-around view providing apparatus 100 generates a wrap-around view including 3D spatial information. That is, the wrap-around view providing apparatus 100 uses 3D distance information generated from the 3D spatial information, thereby minimizing undesired image distortion caused by projecting an image onto a conventional semi-circular model.

In the wrap-around view according to the disclosure, a floor surface and a wall surface are clearly distinguished because an image is projected onto a 3D model generated to separate the floor surface and wall surface. Accordingly, the wrap-around view of the disclosure can minimize image distortion by projecting an image based on the same structure as an actual structure, and also maximize the 3D effect of the image.

FIG. 12 is a flow diagram illustrating a method for providing a wrap-around view according to an embodiment of the present disclosure.

Referring to FIGS. 1 and 12, the wrap-around view providing method includes measuring 3D spatial information through the 3D Lidar and the navigation sensor, generating 3D distance information by projecting the measured 3D spatial information onto a 2D plane, and generating a wrap-around view by using the generated 3D distance information. The wrap-around view providing method can not only provide a 3D effect like a perspective view of a real world by reflecting the 3D spatial information, but also minimize undesired image distortion.

At operation S110, the wrap-around view providing apparatus 100 acquires image information in all directions and measures 3D spatial information in all directions to collect information. The 3D spatial information includes first spatial information including 3D spatial coordinates and intensity of reflected signals, and second spatial information including a roll and a pitch.

At operation S120, the wrap-around view providing apparatus 100 generates 3D distance information by projecting the 3D spatial information onto a 2D plane. Specifically, the wrap-around view providing apparatus 100 corrects a posture in the 3D spatial information, removes information corresponding to a floor surface and a ceiling surface from the 3D spatial information, removes outliers from the 3D spatial information, and extracts a wall surface. Then, the wrap-around view providing apparatus 100 generates the 3D distance information projected onto the 2D plane by removing Z-axis information from the 3D spatial information, based on the extracted wall surface.

At operation S130, the wrap-around view providing apparatus 100 generates a 3D model in which a 3D space is modeled using the generated 3D distance information. Specifically, the wrap-around view providing apparatus 100 generates a 2D model by connecting neighboring points in a clockwise or counterclockwise direction based on a point having an angle closest to zero among points included in the 3D distance information. Then, the wrap-around view providing apparatus 100 creates a wall surface by connecting four points vertically residing above and below two adjacent edge points among edge points existing in the generated 2D model. By repeatedly creating wall surfaces from edge points existing in the 2D model, the wrap-around view providing apparatus 100 generates the 3D model.

At operation S140, the wrap-around view providing apparatus 100 generates a wrap-around view by projecting the image information onto the generated 3D model. Specifically, the wrap-around view providing apparatus 100 performs image mapping by projecting the image information corresponding to points existing in the 3D model.

In addition, the wrap-around view providing apparatus 100 may further process the acquired image information. For example, the wrap-around view providing apparatus 100 may remove distortion from the image information and perform image processing to cut or convert an unnecessary portion of the image. Also, the wrap-around view providing apparatus 100 may merge a plurality of processed images into a single image. As such, the wrap-around view providing apparatus 100 may pre-process the image projected onto the 3D model and also improve the quality of the wrap-around view finally generated.

Figure 13:
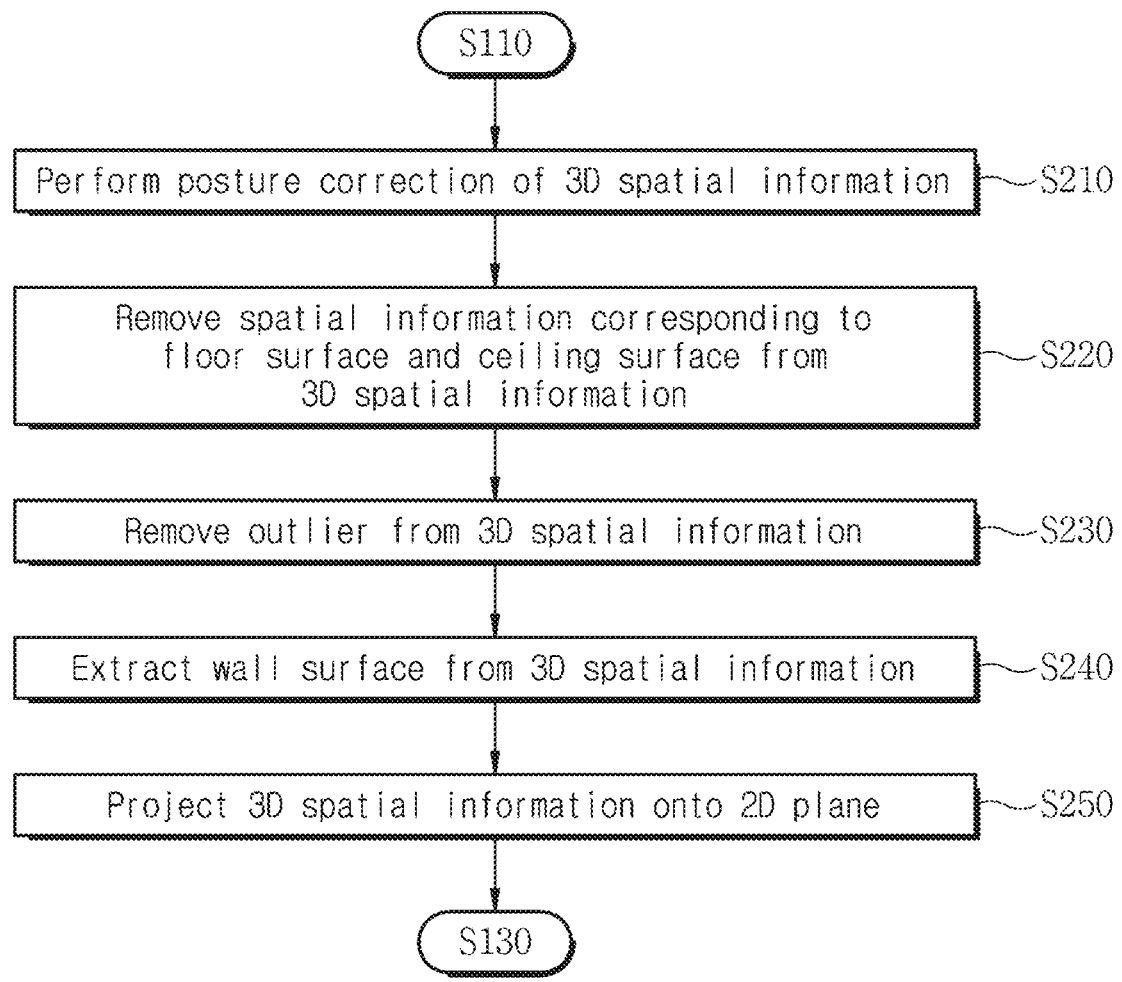
FIG. 13 is a flow diagram illustrating a method for generating 3D distance information according to an embodiment of the present disclosure.

FIG. 13 is a flow diagram illustrating a method for generating 3D distance information according to an embodiment of the present disclosure.

Referring to FIGS. 1, 12 and 13, the 3D distance information is generated from the 3D spatial information, so that a 3D effect can be improved and also undesired image distortion can be reduced.

At operation S210, the wrap-around view providing apparatus 100 performs a posture correction on the 3D spatial information. Specifically, the wrap-around view providing apparatus 100 performs the posture correction on first spatial information by using at least one of a roll and a pitch of measured second spatial information. In addition, by using at least one of a roll and a pitch included in the second spatial information, the wrap-around view providing apparatus 100 aligns the Z-axis of the first spatial information measured in a state that is not parallel with a floor.

At operation S220, the wrap-around view providing apparatus 100 removes spatial information corresponding to a floor surface and a ceiling surface from the 3D spatial information. Specifically, the wrap-around view providing apparatus 100 may assign upper and lower effective ranges based on the Z-axis in a state where the entire 3D spatial information has been corrected through a Z-axis pass through algorithm, and then remove unnecessary spatial information corresponding to the floor and ceiling surfaces.

At operation S230, the wrap-around view providing apparatus 100 removes outliers from the 3D spatial information. Specifically, by using a statistical outlier removal filter, the wrap-around view providing apparatus 100 may remove outliers from the 3D spatial information.

At operation S240, the wrap-around view providing apparatus 100 extracts a wall surface from the 3D spatial information. Specifically, by using a region growing segmentation algorithm, the wrap-around view providing apparatus 100 may extract a wall surface from the 3D spatial information.

At operation S250, the wrap-around view providing apparatus 100 generates 3D distance information by projecting the 3D spatial information onto a 2D plane. Specifically, in order to generate the 3D distance information, the wrap-around view providing apparatus 100 may set all point values corresponding to the Z-axis to zero and project the 3D spatial information as a 2D image by using only the x and y coordinates.

The above-described methods according to various embodiments of the present disclosure may be implemented as instructions stored in a non-transitory computer-readable recording medium in a programming module form. When the instructions are executed by a processor, the processor may execute a function corresponding to the instructions. The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. An apparatus for providing a wrap-around view based on three-dimensional (3D) distance information, the apparatus configured to be installed in a moving object, the apparatus comprising:
a camera module configured to acquire image information in all directions around the moving object;
a sensor module configured to measure 3D spatial information in all directions around the moving object;
a controller configured to generate 3D distance information by projecting the measured 3D spatial information onto a two-dimensional (2D) image, to generate a 3D model in a 3D space by using the generated 3D distance information, to generate a wrap-around view by mapping the acquired image information to the generated 3D model,
the controller further configured to extract a normal vector from each of 3D points of the 3D spatial information, to extract a wall surface from the 3D spatial information by using the extracted normal vector, to remove Z-axis information from the 3D spatial information based on the extracted wall surface, and to project the 3D spatial information from which the Z-axis information is removed onto the 2D image in order to generate the 3D distance information; and
a communication circuit in wireless data communication with a user terminal, the communication circuit configured to transmit the generated wrap-around view to the user terminal such that the transmitted wrap-around view is displayed on the user terminal,
wherein the sensor module includes:
a 3D Lidar sensor configured to measure first spatial information including 3D spatial coordinates and intensity of reflected signals; and
a navigation sensor configured to measure second spatial information including roll and pitch,
wherein in response to the 3D Lidar sensor being tilted, the controller is configured to perform a posture correction of the 3D Lidar sensor by aligning a Z-axis of the first spatial information measured in a state that the 3D Lidar sensor is not parallel with a floor by using at least one of the roll or the pitch included in the second spatial information,
wherein the controller is further configured to assign upper and lower effective ranges based on the Z-axis in a state where entire 3D spatial information has been corrected through a Z-axis pass through algorithm, and then remove unnecessary spatial information corresponding to a floor surface and a ceiling surface.

2. The apparatus of claim 1, wherein the controller is further configured to remove the unnecessary spatial information corresponding to the floor surface and the ceiling surface from the 3D spatial information by using Z-axis information of the 3D spatial information.

3. The apparatus of claim 1, wherein the controller is further configured to remove outliers from the 3D spatial information.

4. The apparatus of claim 1, wherein the controller is further configured to generate a 2D model in which a 2D space is modeled using the 3D distance information, and to generate a 3D model by creating a wall surface perpendicular to edge points whose distance are shorter than a predetermined radius among points existing in the generated 2D model.

5. The apparatus of claim 1, wherein the controller is further configured to match points included in the 3D model with points included in projection information of the image information, and to perform image mapping by projecting the image information on the point-matched 3D model.

6. A system for monitoring a moving object that autonomously moves and performs a particular work, the system comprising:
the wrap-around view providing apparatus of claim 1; and
a user terminal configured to receive the wrap-around view from the wrap-around view providing apparatus and output the received wrap-around view to monitor the moving object.

7. A method for providing a wrap-around view based on three-dimensional (3D) distance information, the method comprising:
at the wrap-around view providing apparatus of claim 1, collecting information by acquiring image information in all directions around the moving object and measuring 3D spatial information in all directions around the moving object;
at the wrap-around view providing apparatus, generating 3D distance information by projecting the measured 3D spatial information onto a 2D plane;
at the wrap-around view providing apparatus, generating a 3D model in which a 3D space is modeled using the generated 3D distance information; and
at the wrap-around view providing apparatus, generating a wrap-around view by image-mapping the image information to the generated 3D model,
wherein generating the 3D distance information includes:
extracting the normal vector from each of the 3D points of the 3D spatial information;
extracting the wall surface from the 3D spatial information by using the extracted normal vector;
removing the Z-axis information from the 3D spatial information based on the extracted wall surface; and
projecting the 3D spatial information from which the Z-axis information is removed onto the 2D image.

* * * * *